(12) United States Patent
Shear

(10) Patent No.: US 7,193,520 B2
(45) Date of Patent: Mar. 20, 2007

(54) ANTI-HIJACKING SYSTEM FOR AIRPLANES AND AIRPORTS

(76) Inventor: Daniel Shear, P.O. Box 91311, Santa Barbara, CA (US) 93190

( * ) Notice: Subject to any disclaimer, the term of this patent is extended or adjusted under 35 U.S.C. 154(b) by 329 days.

(21) Appl. No.: 10/255,371

(22) Filed: Sep. 26, 2002

(65) Prior Publication Data

US 2003/0090382 A1  May 15, 2003

Related U.S. Application Data

(60) Provisional application No. 60/325,104, filed on Sep. 27, 2001.

(51) Int. Cl.
*G08B 13/00* (2006.01)
(52) U.S. Cl. .................. 340/574; 340/573.1; 340/945; 244/117 R
(58) Field of Classification Search ................ 340/945, 340/574, 573.1, 540, 963; 244/117, 1 R, 244/121, 117 R
See application file for complete search history.

(56) References Cited

U.S. PATENT DOCUMENTS

| | | | | | |
|---|---|---|---|---|---|
| 3,658,277 | A | * | 4/1972 | Anderson | 244/1 R |
| 3,704,845 | A | * | 12/1972 | Ord | 244/121 |
| 5,611,408 | A | * | 3/1997 | Abukhader | 180/287 |
| 5,969,433 | A | * | 10/1999 | Maggiora et al. | 307/10.5 |
| 2003/0052227 | A1 | * | 3/2003 | Pittman | 244/118.5 |
| 2003/0052798 | A1 | * | 3/2003 | Hanson | 340/945 |
| 2003/0058112 | A1 | * | 3/2003 | Gleine | 340/573.1 |

* cited by examiner

*Primary Examiner*—Anh V. La
(74) *Attorney, Agent, or Firm*—Charles R. Sutton

(57) ABSTRACT

An anti-hijacking apparatus for aircraft and airports including combinations of the following elements: panic/silent alarms hidden on the aircraft, brake locks on the aircraft which can be controlled remotely, tire deflating devices which can be controlled remotely, a fuel line shut-off valve which can be controlled remotely, a fortified cockpit door, bullet proof backs to cockpit seats, a flight system remote control which protects high rise buildings from aircraft collisions, smoke generators, gas dispensers, and other methods of obscuring vision in the passenger cabin, and stun devices and tranquilizer darts.

17 Claims, 16 Drawing Sheets

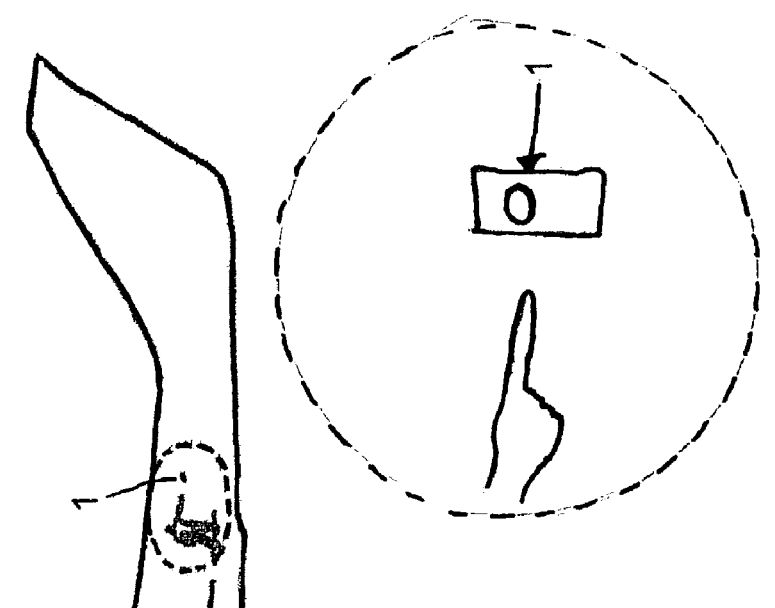
FIG. 1B
FIG. 1
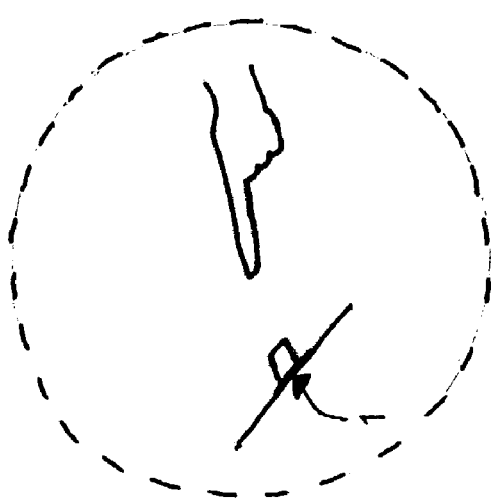
FIG. 1A

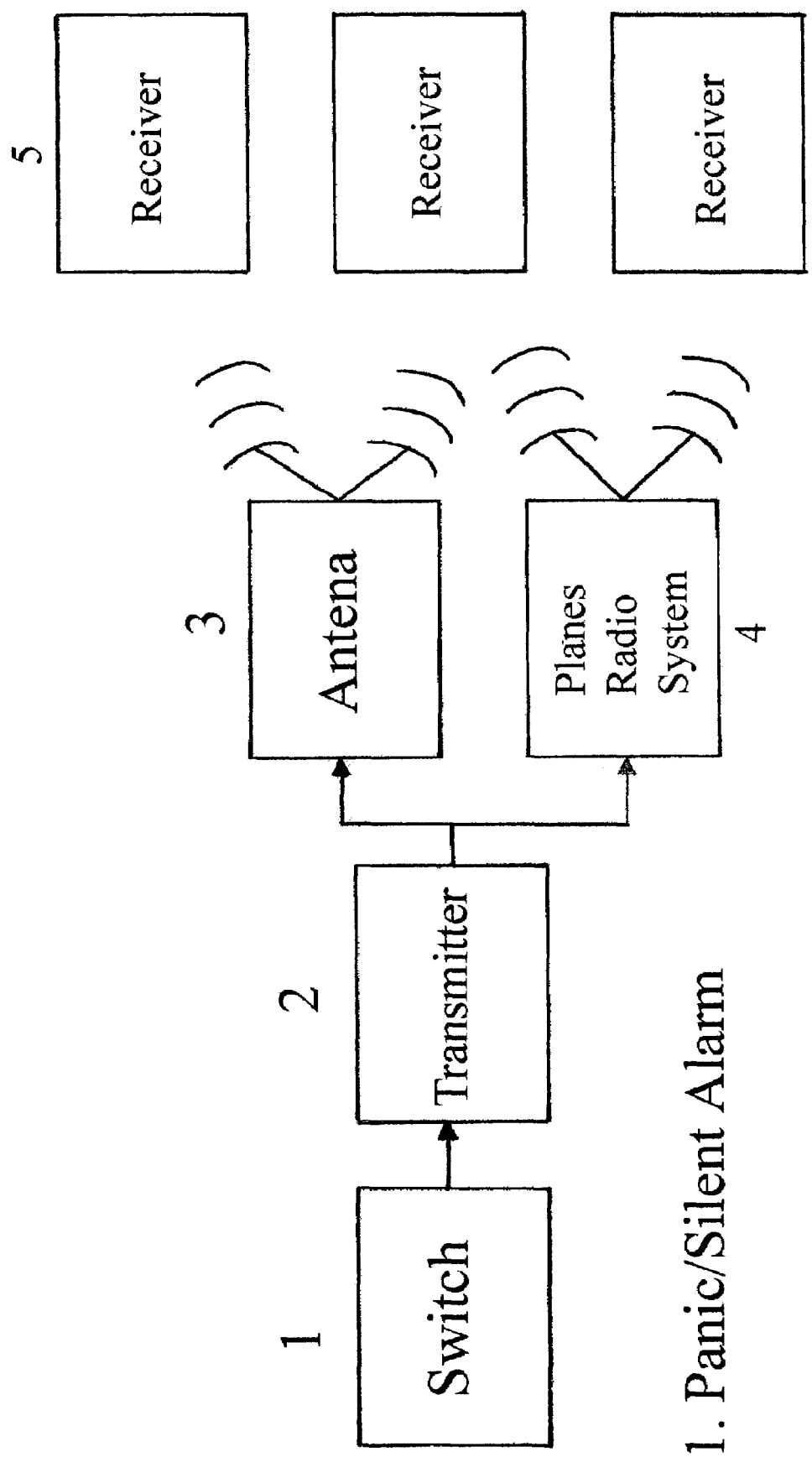

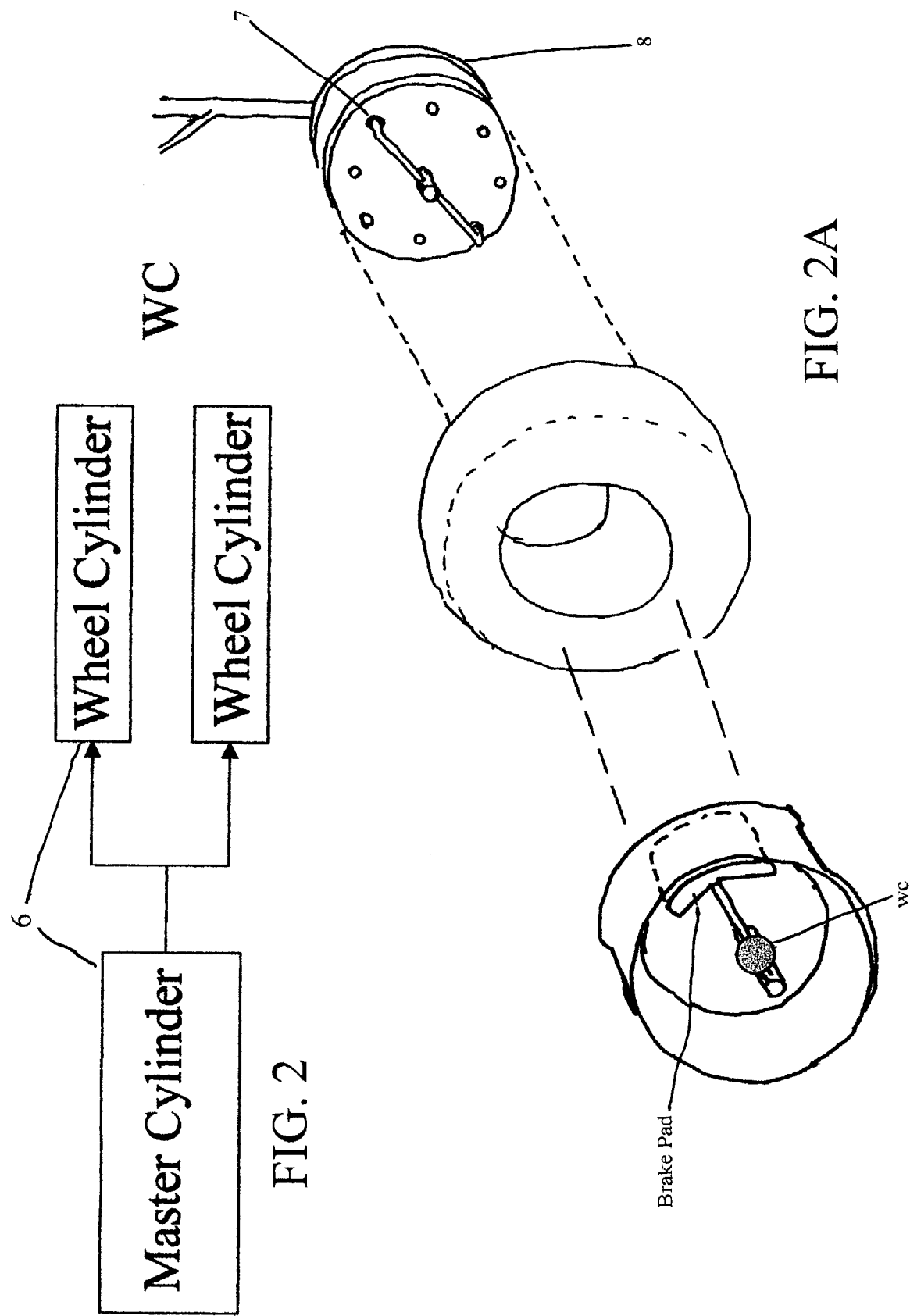

ANTI-HIJACKING SYSTEM FOR AIRPLANES AND AIRPORTS

CROSS-REFERENCE TO RELATED APPLICATIONS

This application incorporates provisional application No. 60/325,104 by this reference. Provisional application No. 60/325,104 was filed on Sep. 27, 2001. Applicant claims the benefit of the Sep. 27, 2001 filing date pursuant to 35 U.S.C. 119.

STATEMENT AS TO RIGHTS TO INVENTIONS MADE UNDER FEDERALLY-SPONSORED RESEARCH AND DEVELOPMENT

This invention was not made under Federally-Sponsored Research and development. Applicant retains all rights.

BACKGROUND OF THE INVENTION

1. Field of the Invention

This invention falls within the field of anti-crime devices generally, and in particular it falls within the field of systems to prevent aircraft and airport takeovers or hijacking.

2. Description of Related Art Including Information Disclosed Under 37 CFR Sections 1.97 and 1.98

The related art contains devices which will provide an alert when there is an unauthorized usage of an aircraft parked at the airport. Brake locks can be found as an antitheft measure for vehicles, usually land vehicles, which are rarely remotely triggerable. At least one magnetic device exists for runways designed to slow crippled planes during landing. Devices exist which can deflate or reinflate the tires of vehicles associated with airports, but these devices are customarily found on or in the hubs of the vehicle's wheels. Fuel line shut off valves can be found as an antitheft measure for vehicles generally, but most usually land vehicles. These are rarely remotely triggerable. Cockpit fortification is practiced by the Israeli airline. Several systems exist by which the position of aircraft, land craft, and other objects is monitored and a collision avoidance signal is given to alert a human operator regarding the dangerous condition. U.S. Pat. No. 5,917,405 will detect the relative position of at least two things and in response to this information will activate, deactivate, enable, or disable vehicle systems not including directional controls. It will not automatically or remotely steer a vehicle away from a collision. The Predator aircraft of the Central Intelligence Agency can be piloted remotely, but does not carry passengers.

SUMMARY OF THE INVENTION

This invention constitutes an apparatus to prevent or thwart hijacking in aircraft or airports comprising one or more of the following elements, each of which may be combined with each of the others:
1. Panic/silent alarms
2. Airplane brake locks
3. Remote triggered tire deflating devices
4. Backup remote triggered runway tire deflating devices
5. Remote or internally triggered fuel line shut off valve
6. Improved cabin divider and door to cockpit/pilot's area
7. Bullet proof backs to pilot seats
8. Flight system remote control with hi-rise protect system
9. Smoke generators/vision obscurement devices
10. Stun devices and tranquilizer darts.

BRIEF DESCRIPTION OF THE DRAWINGS

FIG. 1 illustrates the panic/silent alarm feature of the invention.

FIG. 2 illustrates the remote control brake lock feature of the invention.

DESCRIPTION OF THE PREFERRED EMBODIMENT

Figure 3A:
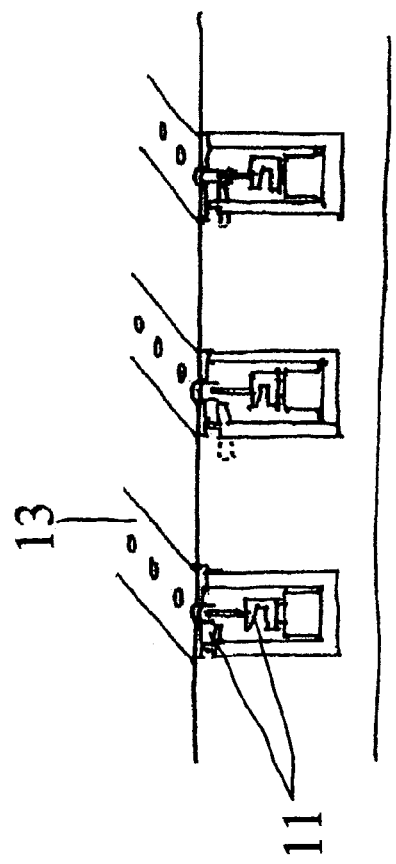
FIG. 3 illustrates the runway tire deflating device aspect of the invention.
Figure 3B:
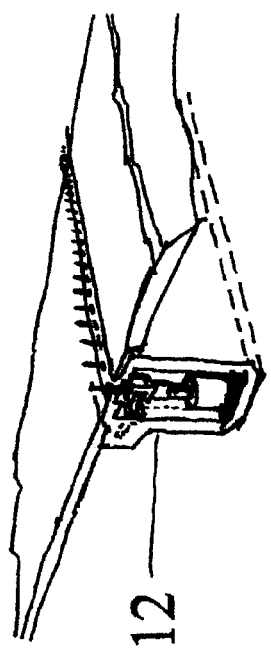
Figure 3:
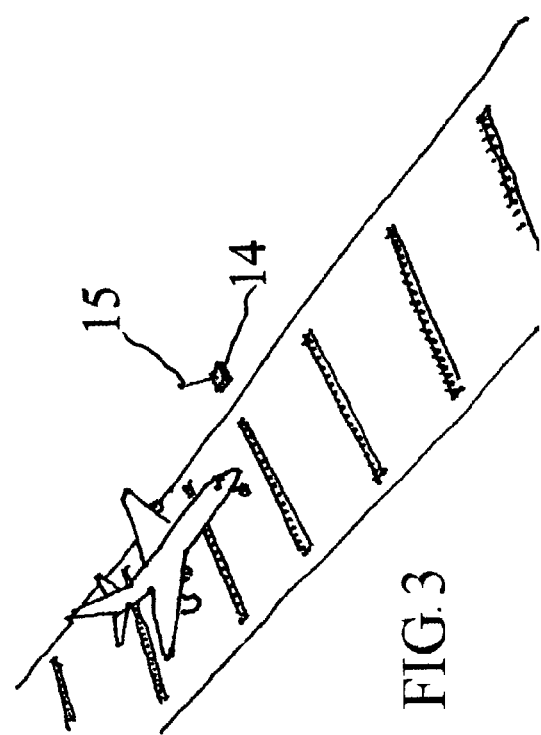
Figure 3C:
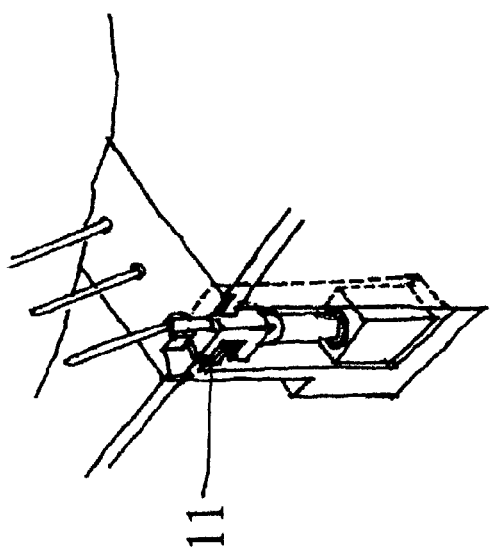
Figure 4:
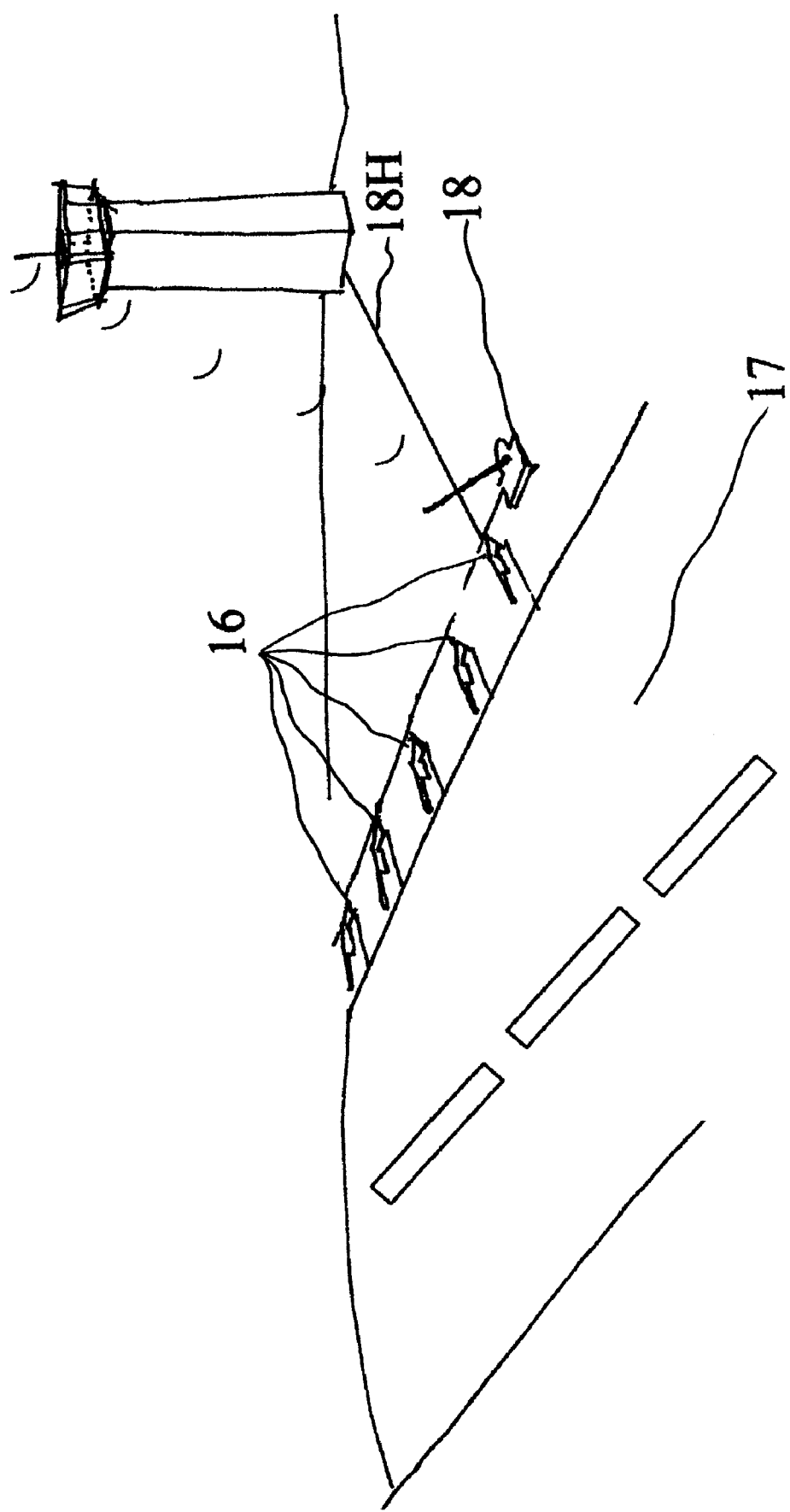
FIG. 4 illustrates the backup remote triggered runway tire deflating device aspect of the invention.
Figure 5:
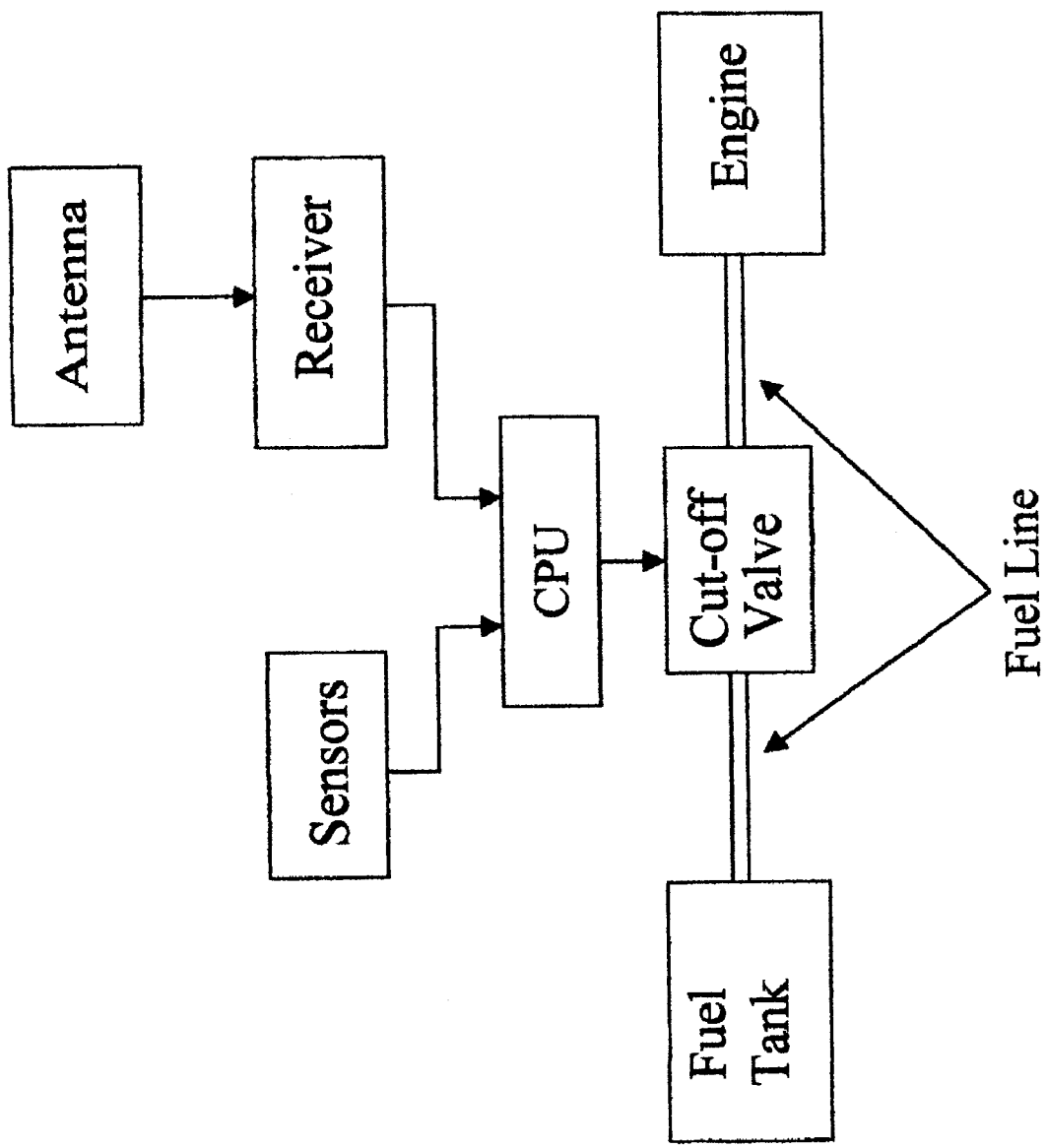
FIG. 5 is a flow chart of the remotely triggered fuel line shut off valve aspect of the invention.
Figure 6:
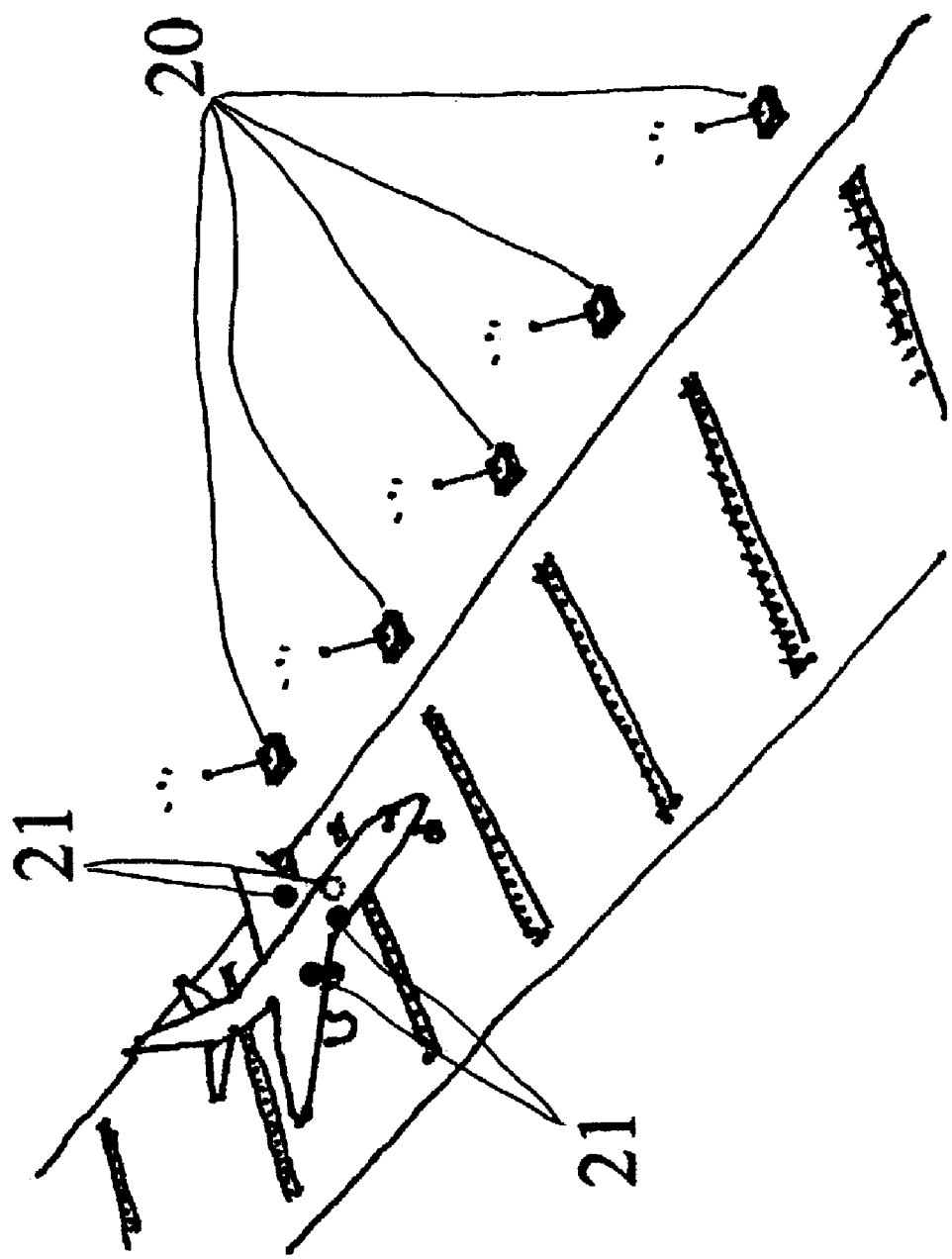
FIG. 6 illustrates the remotely triggered fuel line shut off valve aspect of the invention.
Figure 7A:
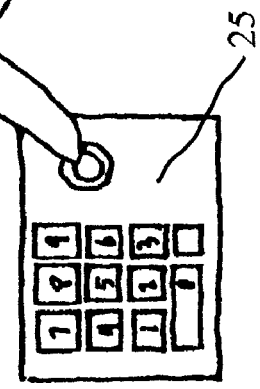
FIG. 7 illustrates the cockpit fortification elements of the invention.
Figure 7:
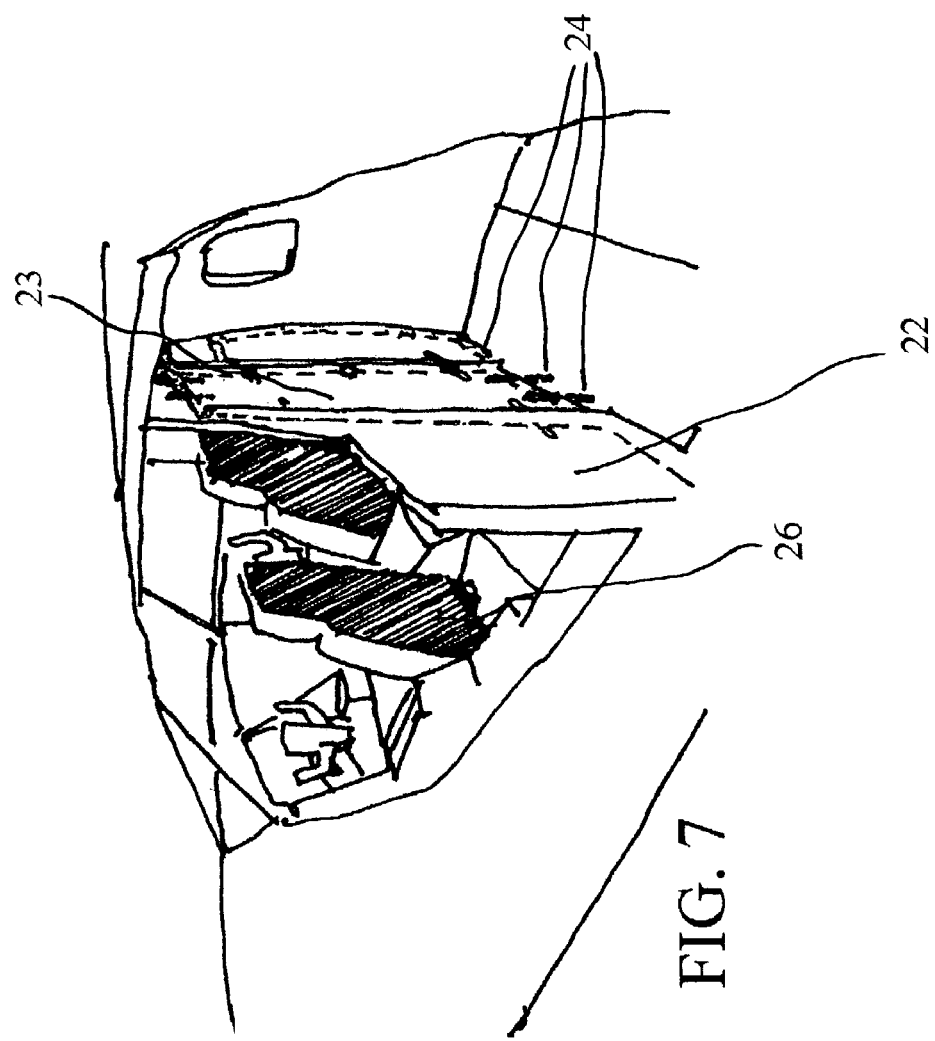
Figure 8A:
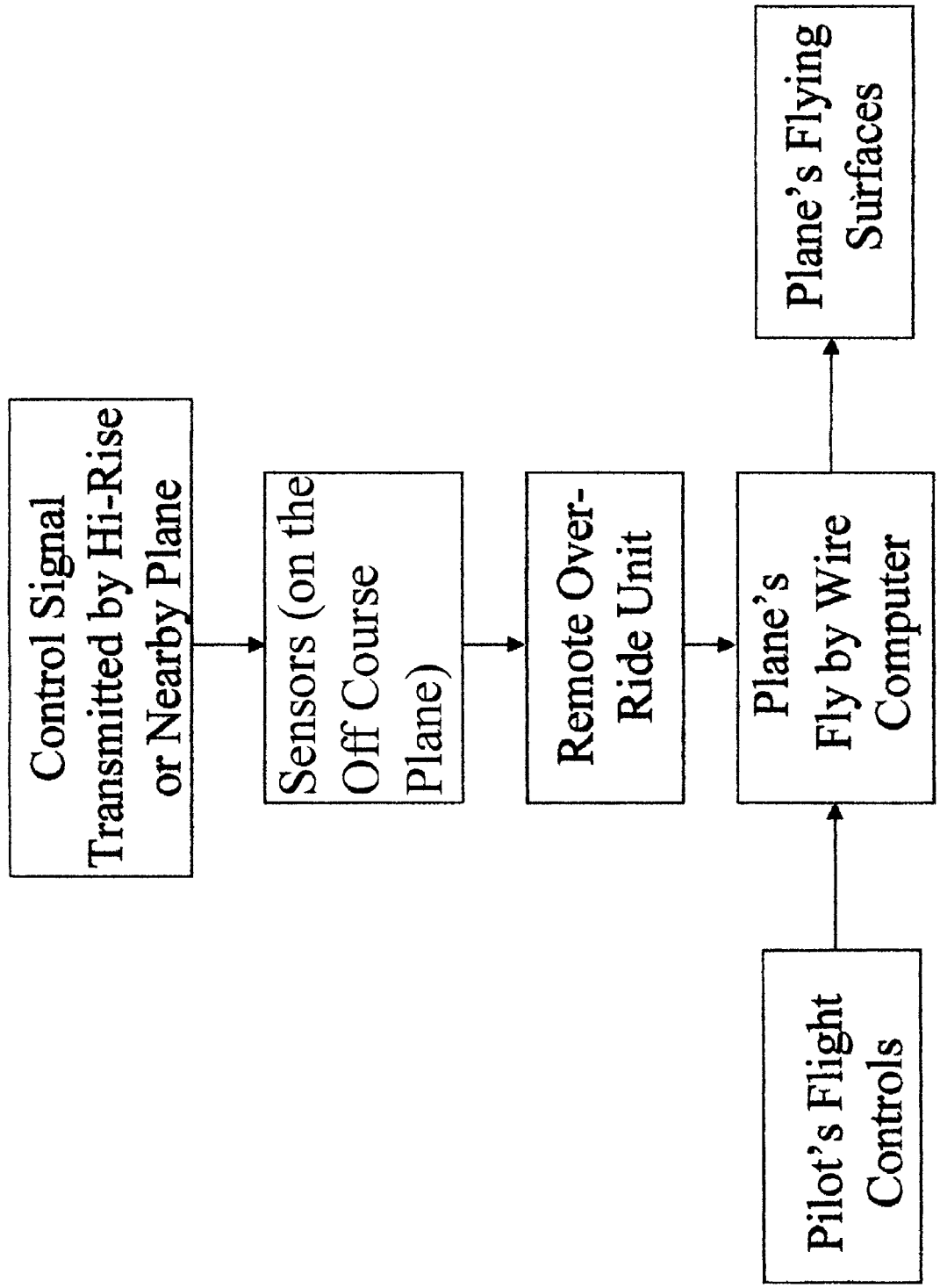
FIG. 8(a) is a flow chart of the flight system remote control and Hi-Rise Protect System.
Figure 8B:
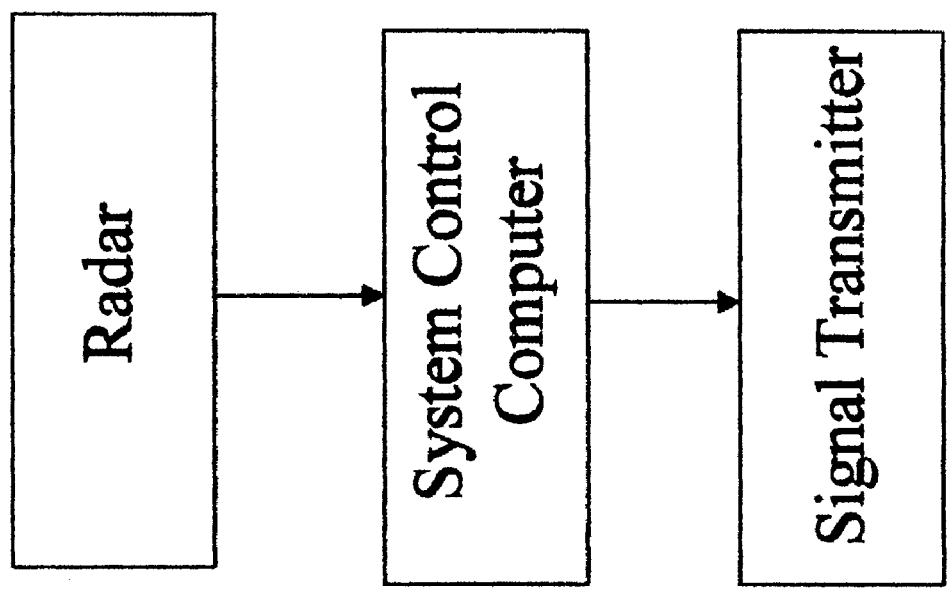
FIG. 8(b) is a flow chart of the building radar of the Hi Rise Protect System.
Figure 8C:
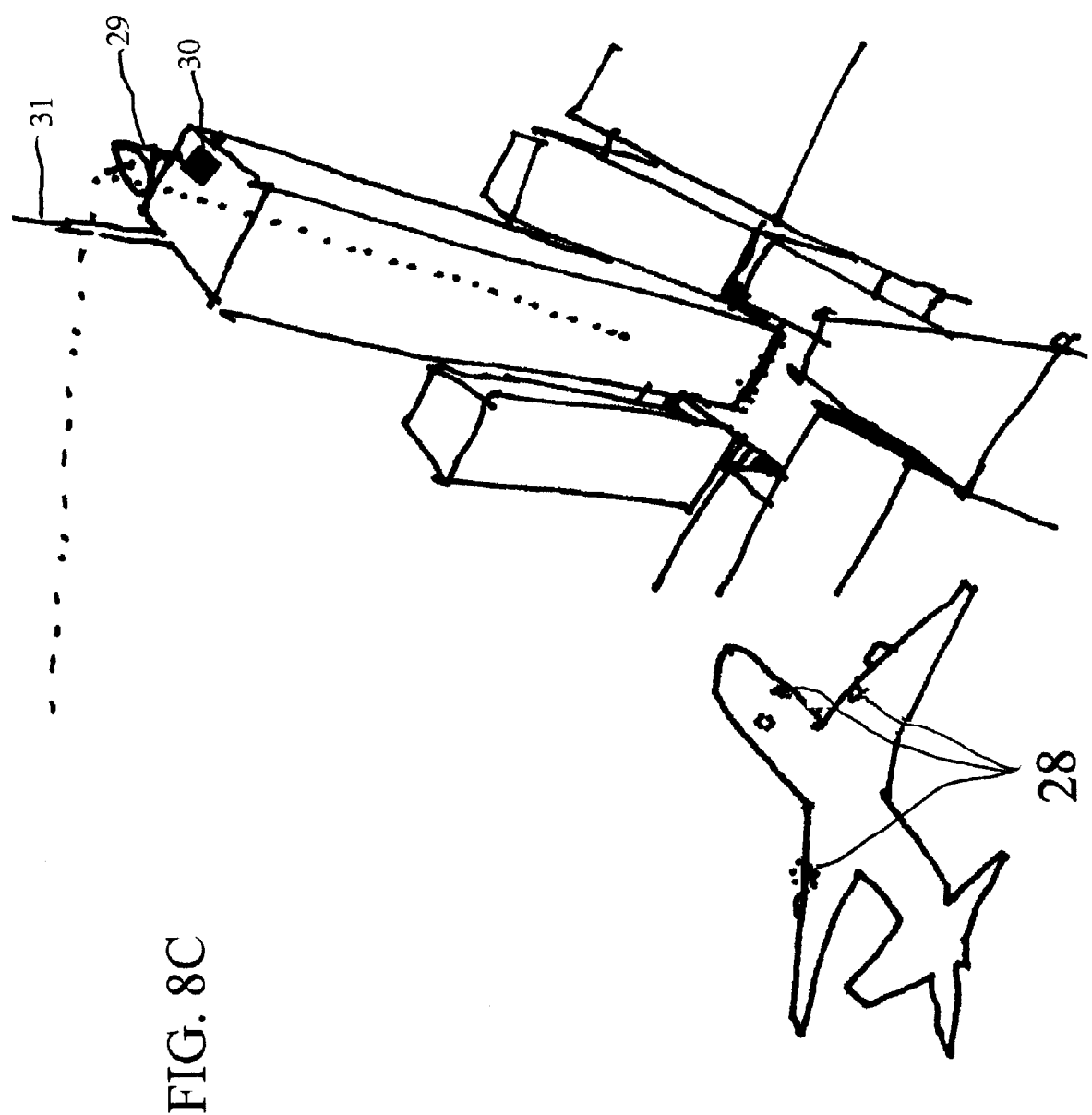
FIG. 8(c) illustrates the flight system remote control with Hi Rise Protect System.
Figure 9:
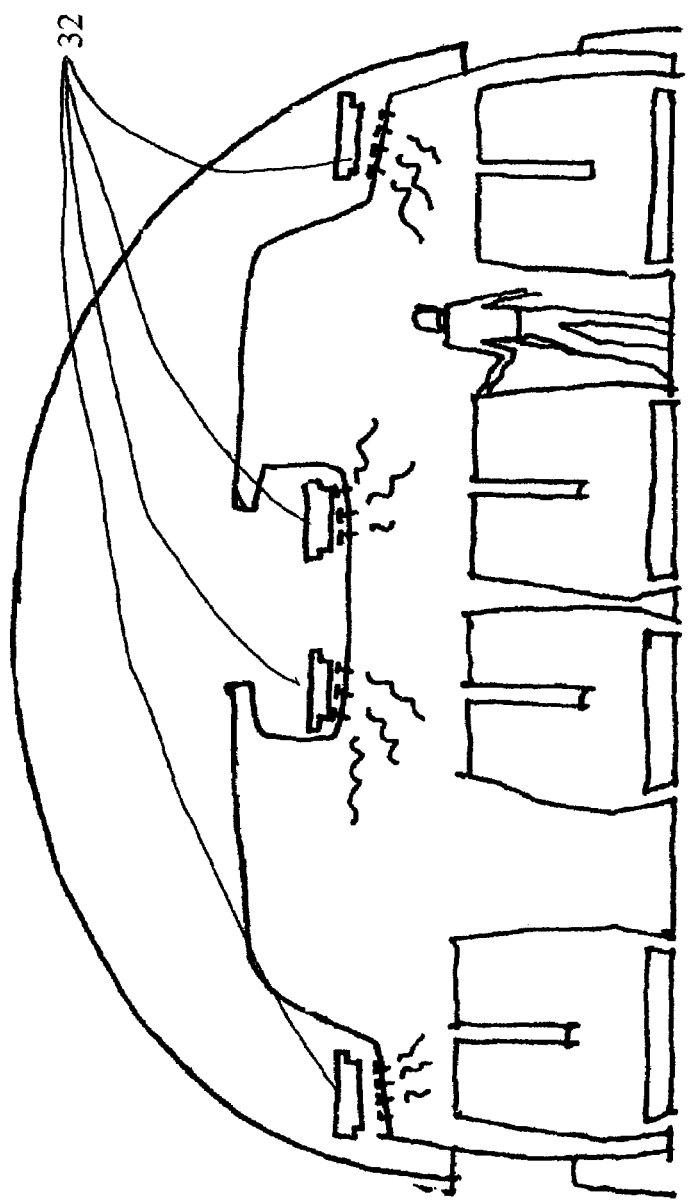
FIG. 9 illustrates the visual obscurement aspect of the invention.
Figure 9A:
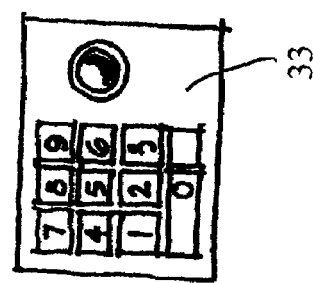
Figure 10:
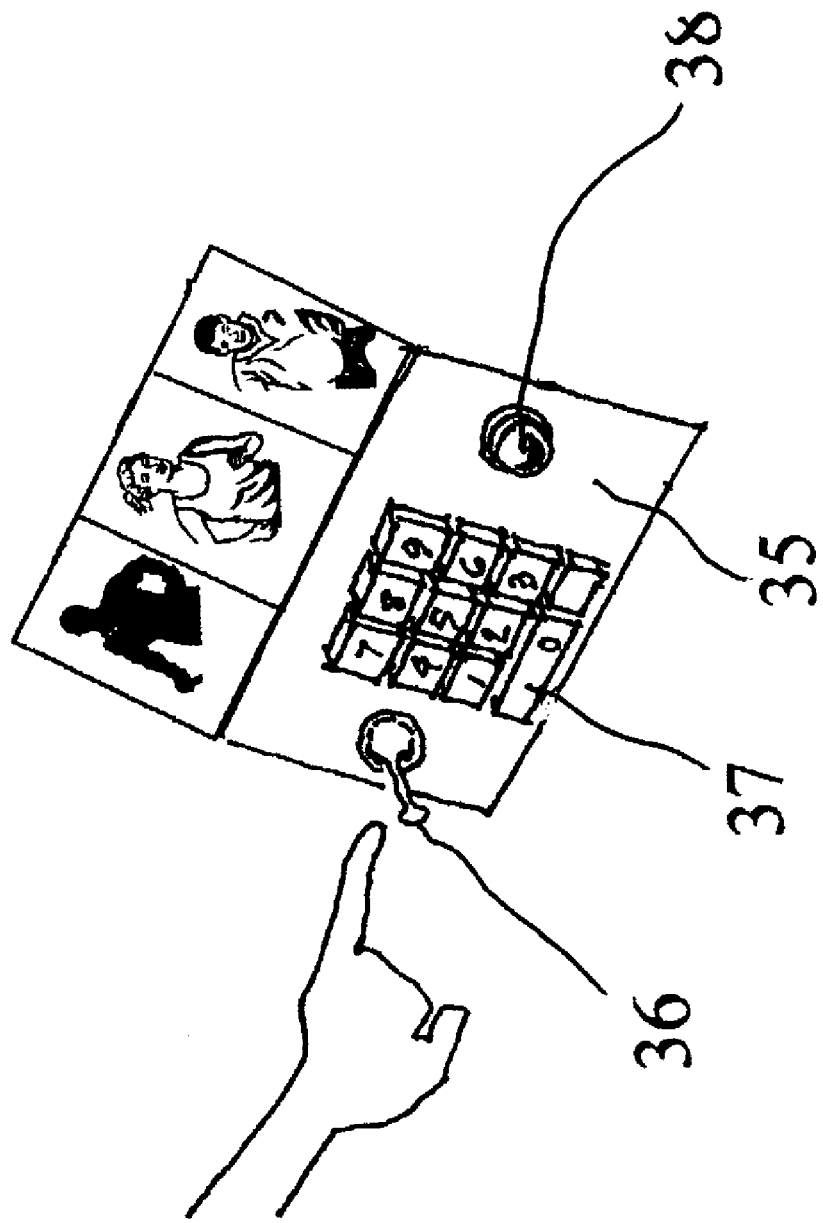
FIGS. 10, 10(a), 10(c) illustrates the remote control tranquilizer/stun aspects of the invention.
Figure 10A:
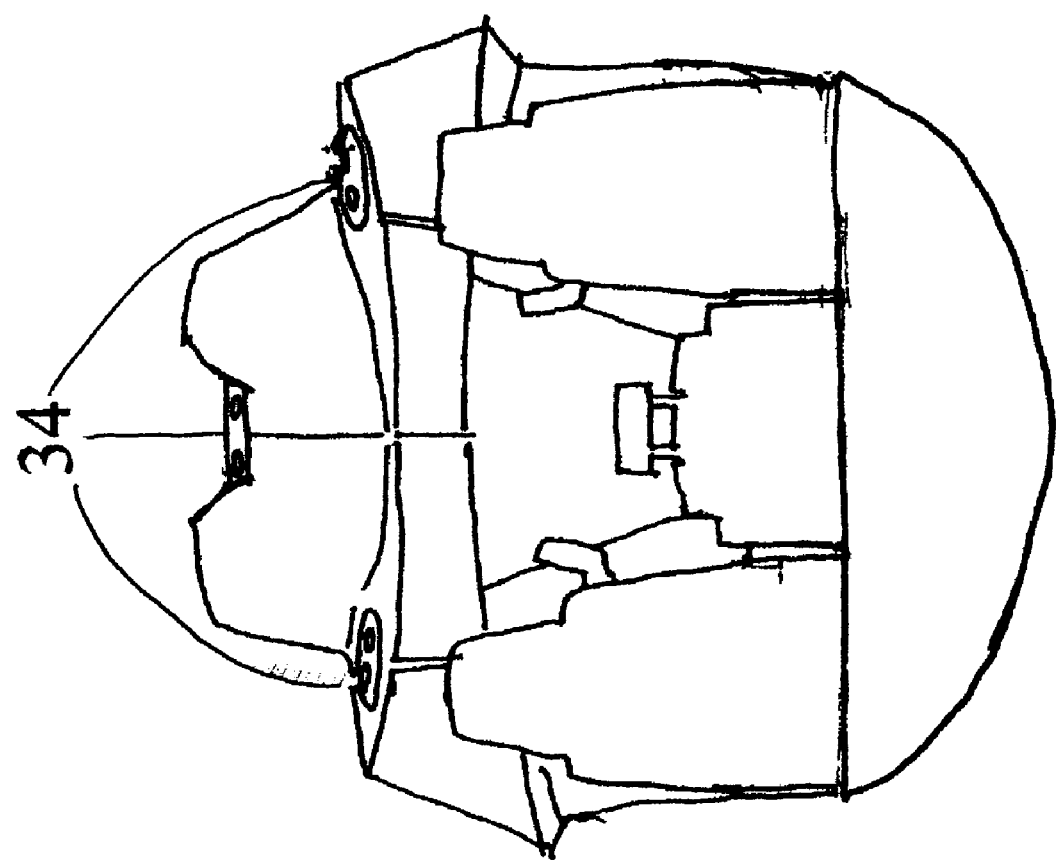
Figure 10B:
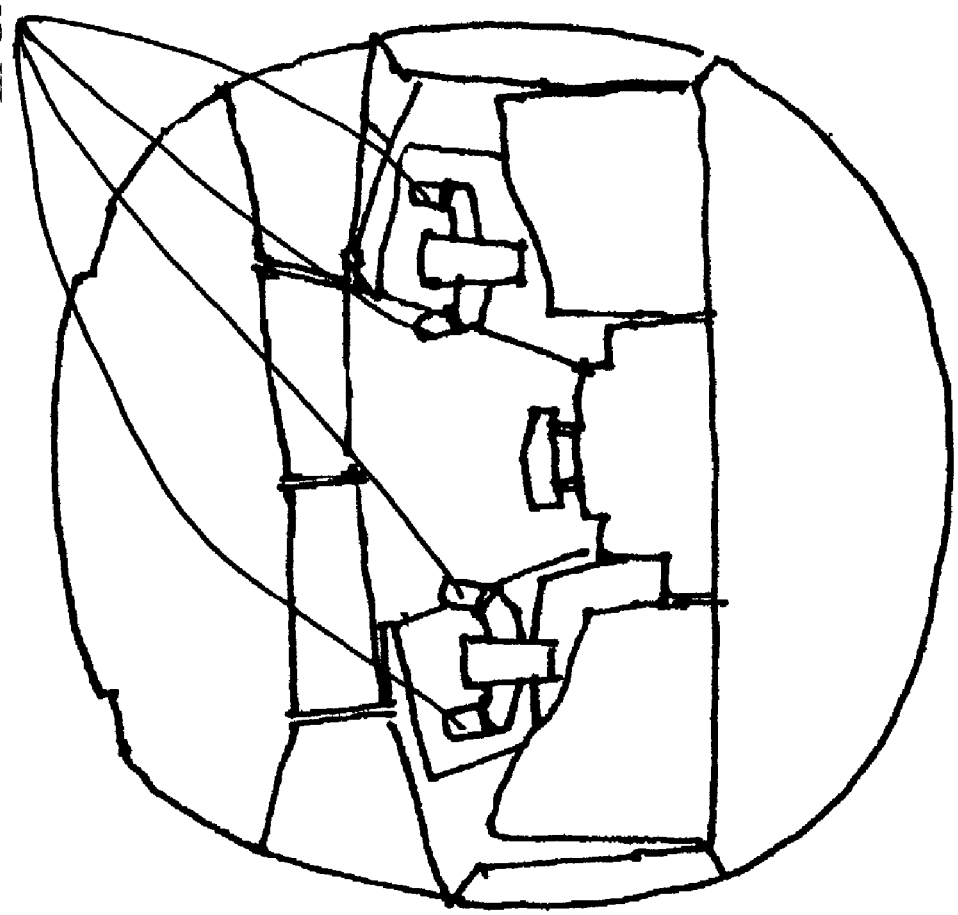
FIG. 10(b) illustrates the flight control stun device aspect of the invention.
Figure 10C:
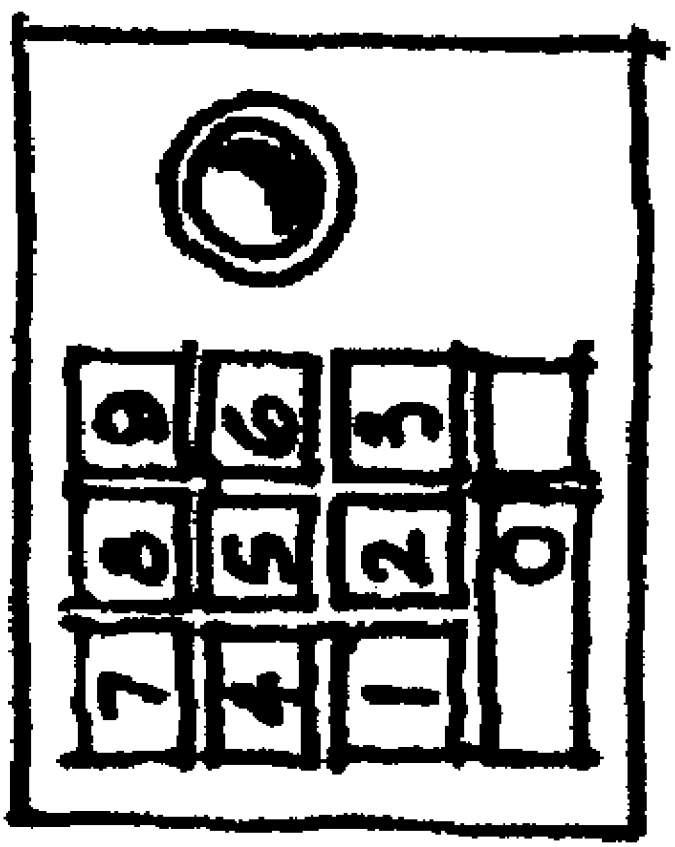

This system is designed to: 1) Prevent hi-jackers from entering the cockpit/pilot areas of the plane, 2) regain control of a hi-jacked plane, 3) prevent hi-jacked planes from taking off, 4) prevent hi-jacked planes and planes that are off course from hitting hi-rise and other buildings.

Panic/silent alarms—like a silent alarm used in banks, these hidden buttons can be activated by the plane's flight crew in the event of a hi-jack attempt. Depressing any of the hidden buttons (1) will activate a transmitter (2) to send out an alarm signal via an antenna (3) or the plane's radio system (4) to the control tower and also via RF and other signals (satellite, microwave) to other receivers (5) at other security locations. This silent alarm signal can be used only to notify authorities or can also trigger one or more of the following subsystems that make up this total anti-hijacking system.

Brake locks, using a separate hydraulic (6) or mechanical system (7) lock the wheels (8) of the plane when a hijack attempt has been detected. Once activated the brakes will stay locked until the ground crews release them. There will be no way for the plane's crew to deactivate this brake lock, thus preventing the plane from being moved and from taking off.

A remotely triggered runway tire deflating device is provided to prevent a hi-jacked plane from taking off. This device will puncture the tires of the plane, thus preventing it from reaching take off speed. Deflating devices (9) are sharp spikes which can be deployed (pushed up) from their resting position (10) below the runway by means of either compressed air cartridges, electric motors, hydraulic systems, explosive devices similar to those used to deploy air bags, or by other means. Once they are deployed, a latch (11) will secure the spikes in their tire deflating position. The complete device will be inserted into a metal jacket/box (12) placed into the runway to allow removal of the device for inspection and maintenance. The top of this jacket/box will be a metal cover with holes (13) in it for the spikes to go through. This metal cover will also allow planes to roll normally down the runway when spikes are not deployed. This tire deflating subsystem can be activated manually by throwing a switch or remotely by radio/RF/Laser/Microwave control signals. This tire deflating subsystem can also be set automatically to activate if the panic/silent alarm is received. Remote activation by radio/RF/Laser/Microwave control signals is accomplished by detecting and decoding the signal by the receiver unit (14) and antenna (15).

Machine guns (16) are used as a backup remote triggered tire deflating device. The machine guns are placed along the runway (17) with radio control (18) and hardwire control from the control tower. When activated, the guns will shoot out the tires on the plane, preventing it from reaching take off speed.

Fuel line cut off valves with manual and remote controls operate by blocking the fuel lines to the plane's engines. Thus, hijacked planes cannot take off. This valve (19) can be configured to respond either to manual, radio, RF, microwave, laser, or panic/silent alarm signal control, or any combination of these. The transmitters (20) placed along the runway and/or control tower can be used with receivers (21) on the plane to send a fuel cutoff command. By using short distance wavelengths/low power transmitters or by employing a unique security code for each plane into the system, only the selected plane(s) will be affected. Sensors and a central processing unit (CPU) can be added to allow shut off only if a plane is still on the ground. Sensors in the wheel units would detect if weight is still on the wheels and/or other sensors for plane speed or altitude could also be included in the decision process if desired. An improved cabin divider and door to the cockpit/pilot's area is provided. It consists of bullet proof materials like KEVLAR or steel in the divider (22) between the cockpit and the passenger compartment, and a bullet proof door (23) with bank vault like latches (24). This will make it much harder for hijackers to gain access to the pilots and the plane's controls. In the event where the pilots become unconscious or somehow the hijackers have gained access to the cockpit, a hidden remote opening switch (25) can be operated by the flight crew if they have the correct security code.

Bullet proof backs are provided to the seats for the pilot and co-pilot. By adding KEVLAR or steel to the backs of the pilot's seats (26), pilots can be protected from small arms fire.

Flight system remote control and auto protect of hi-rise buildings is provided. This subsystem consists of a remote override unit (27) and sensors/antennas (28). When a plane has been hijacked, or is off course, flying another plane nearby and transmitting control signals will allow the control signals to take control of the hijacked plane, thus allowing it to be flown safely to a landing or away from buildings. Also transmitters placed along the runway could take control of the plane before it takes off. By placing radar controlled units on major buildings they can be protected. When a plane approaches a protected building and gets within range, the radar controlled unit could either manually or automatically redirect the oncoming plane around the building. The radar control units consist of a radar unit (29), a system control computer (30) and a signal transmitter (31).

Smoke generators and other vision obscurement mechanisms are provided. Smoke generators and/or knock out or other gas dispensers (32) placed in the plane can be triggered by the flight crew to assist them in regaining control of the plane by using hidden switches (33) with security codes. Smoke generators/gas dispensers can also be triggered remotely by control signals via RF, radio, microwave, and laser transmitters.

Tranquilizer darts/stun guns are provided which can be controlled remotely. Multiple stun guns and tranquilizer darts (34) can be aimed and fired by the flight crew using a hidden control panel (35). The control panel contains a joy stick (36) for aiming using a video feed from video monitors for the same purpose, and a touch pad (37) for entering a security code. It also contains a button (38) to fire the darts, tasers or other stun devices.

Stun devices can be built into the pilot's and co-pilot's steering wheels to disable hijackers. These stun units can be triggered by the flight crew, such as through the touch pad (37) or can be triggered remotely. Video cameras inside the cockpit feed video monitors allowing the flight crew to operate devices by use of the hidden control panel (35).

Airports also contain buildings and vehicles which need to be secured. Among the vehicles that can be found at airports are sets of linearly connected carriages being towed by prime movers such as baggage trains and passenger trains. The anti-hijacking system of this invention can also be used to secure buildings and vehicles. Overall airport security can be enhanced by using this invention on buildings and vehicles.

It is readily apparent that the above described anti-hijacking system meets all the objectives mentioned and also has other advantages for anti-crime usage. It should be understood that the specific form of the invention described above is intended to be representative only of possible embodiments. Certain modifications within the scope of these teachings will be apparent to those skilled in the art of security systems and therefore this specification is not intended to limit the scope of the claims.

I claim:

1. An aircraft anti-hijacking apparatus comprising an aircraft having a passenger cabin, the aircraft having means selectively to stun persons in the aircraft during an attempted hijacking; a radar unit with a signal output, a system control computer having a control computer input and a plurality of control computer outputs, and a signal transmitter having a signal input; the radar unit sensing when the aircraft approaches a building and emitting a signal through the signal output; the control computer receiving the signal through the control computer input and using the control computer outputs to redirect the aircraft away from the building; the signal transmitter receiving the signal through the signal input and transmitting the signal.

2. The apparatus of claim 1 further comprising means to obscure vision in the passenger cabin during an attempted hijacking.

3. The apparatus of claim 1 wherein the means selectively to stun persons comprises a remote control taser gun.

4. The apparatus of claim 1 wherein the aircraft has steering means and the means selectively to stun persons comprises means to electrify the steering means.

5. The apparatus of claim 1 wherein the aircraft has an innerr airspace and means to flood the inner airspace with atmospheric additives selected from the group consisting of soporific gas, lacrimators, smoke, and tranquilizer gas.

6. The apparatus of claim 1 wherein the aircraft has a panic alarm which can be actuated surreptitiously during an attempted hijacking.

7. An aircraft anti-hijacking apparatus comprising an aircraft having a passenger cabin, the aircraft having means selectively to stun persons in the aircraft during an attempted hijacking;

a cockpit, the cockpit being divided from the passenger cabin by a bullet resistant divider which can be securely locked;

means to obscure vision in the passenger cabin during an attempted hijacking;

a radar unit with a signal output, a system control computer having a control computer input and a plurality of control computer outputs, and a signal transmitter having a signal input; the radar unit sensing when the aircraft approaches a building and emitting a signal through the signal output; the control computer receiving the signal through the control computer input and using the control computer outputs to redirect the aircraft away from the building; the signal transmitter receiving the signal through the signal input and transmitting the signal;

an engine mounted on the aircraft, the engine receiving fuel through a fuel line; and a means selectively to interrupt fuel flow to the engine through the fuel line;

pneumatic tires mounted on the aircraft and means selectively to deflate the pneumatic tires during an attempted hijacking;

brakes mounted on the aircraft and means selectively to lock the brakes during an attempted hijacking;

a panic alarm which can be actuated surreptitiously during an attempted hijacking; and bullet resistant seats mounted on the aircraft.

8. An anti-hijacking apparatus having a radar unit with a signal output, a system control computer having a control computer input and a plurality of control computer outputs, and a signal transmitter having a signal input; the radar unit sensing when an aircraft approaches a building and emitting a signal through the signal output; the control computer receiving the signal through the control computer input and using the control computer outputs to redirect the aircraft away from the building; the signal transmitter receiving the signal through the signal input and transmitting the signal.

9. The anti-hijacking apparatus of claim 8 having a panic alarm mounted on the aircraft which can be actuated surreptitiously during an attempted hijacking.

10. The anti-hijacking apparatus of claim 9 having means remotely to stun persons during a hijacking.

11. The anti-hijacking apparatus of claim 8 wherein the aircraft has brakes mounted thereon and means remotely to lock the brakes during an attempted hijacking.

12. The anti-hijacking apparatus of claim 8 wherein the aircraft has an engine mounted thereon, the engine receiving fuel through a fuel line, and means remotely to interrupt the passage of fuel through the fuel line.

13. The anti-hijacking apparatus of claim 8 having pneumatic tires mounted on the aircraft and means remotely to deflate the pneumatic tires during an attempted hijacking.

14. The anti-hijacking apparatus of claim 8 wherein spaces are on the aircraft, one of the spaces is a cockpit, and the means selectively to inactivate persons can be found in the cockpit.

15. The anti-hijacking apparatus of claim 14 wherein the cockpit has a seat mounted therein, the seat has a back, and the back is bullet resistant.

16. The anti-hijacking apparatus of claim 8 wherein spaces are on the aircraft, one of the spaces is a passenger cabin, and means selectively to inactivate persons can be found in the passenger cabin.

17. The anti-hijacking apparatus of claim 8 wherein spaces are on the aircraft.

* * * * *